United States Patent [19]

Palamara

[11] Patent Number: 4,461,191
[45] Date of Patent: Jul. 24, 1984

[54] METHOD OF PREPARING BUSHING TIPS
[75] Inventor: Eugene G. Palamara, Butler, Pa.
[73] Assignee: PPG Industries, Inc., Pittsburgh, Pa.
[21] Appl. No.: 463,415
[22] Filed: Feb. 3, 1983
[51] Int. Cl.³ .............................................. B21K 5/20
[52] U.S. Cl. ................................. 76/107 S; 29/512;
29/523; 29/522 A; 29/157 C
[58] Field of Search ............... 29/157 C, 512, 523,
29/522 A; 76/107 S

[56] References Cited
U.S. PATENT DOCUMENTS

| | | | |
|---|---|---|---|
| 1,226,090 | 5/1917 | Ludlum | 16/3 |
| 1,609,597 | 12/1926 | Arnt | 29/512 U X |
| 1,647,447 | 11/1927 | Hartnett | 29/512 |
| 1,656,856 | 1/1928 | Gagnon | 29/512 |
| 2,507,638 | 5/1950 | Leahy | 29/512 |
| 2,635,501 | 4/1953 | Eichner | 85/40 |
| 2,779,998 | 2/1957 | Bailey | 29/470.3 |
| 2,830,485 | 4/1958 | Macy | 85/40 |
| 2,856,593 | 10/1958 | Gookin | 339/220 |
| 3,006,026 | 10/1961 | Martin et al. | 76/107 S X |
| 3,102,439 | 2/1958 | Martin et al. | 76/107 |
| 3,141,358 | 7/1964 | Burke, Jr. et al. | 72/341 |
| 3,362,265 | 1/1968 | Thompson et al. | 76/107 S |
| 3,598,952 | 8/1971 | Roberson | 219/107 |
| 3,754,731 | 8/1973 | Mackal et al. | 251/145 |
| 3,766,631 | 10/1973 | Scheitlin et al. | 29/523 X |
| 3,785,029 | 1/1974 | McClellan et al. | 29/157.1 |
| 3,913,421 | 10/1975 | Hawkins | 76/107 |
| 3,940,837 | 3/1976 | Wiese | 29/512 |
| 4,156,160 | 5/1979 | Jackson | 313/292 |
| 4,205,426 | 6/1980 | Stillman, Jr. | 29/512 |

FOREIGN PATENT DOCUMENTS 0170337  10/1921  United Kingdom ............... 29/512

OTHER PUBLICATIONS

K. L. Lowenstein, "The Manufacturing Technology of Continuous Glass Fibers" Elsevier Scientific Publishing Co., New York, 1973.

Primary Examiner—Charlie T. Moon
Assistant Examiner—Ronald S. Wallace
Attorney, Agent, or Firm—John E. Curley

[57] ABSTRACT

A method of supplying tips for a fiber forming bushing is provided which involves mating the tips to a hole in a bushing plate, applying pressure to the tip sidewalls against the plate to firmly seal them followed by a high temperature treatment to form a homogeneous metal bond.

6 Claims, 5 Drawing Figures

METHOD OF PREPARING BUSHING TIPS

BACKGROUND OF THE INVENTION

In the manufacture of glass fibers the glass batch ingredients are typically melted in a large melting furnace and the molten glass resulting from the melting furnace operation flows in a forehearth to a multiplicity of small glass fiber forming devices known in the art as bushings. The bushings are composed of the base plate which carries on it a plurality of nozzles or tips through which the molten glass flows in individual streams to form the glass filaments. The base plate is in turn welded to side walls forming a container having an open top into which the molten glass flows from the forehearth. The bushing is typically electrically heated to maintain the glass therein in a molten condition.

The nozzles or tips formed on the bushing bottom or base plate are relatively small in diameter and can range in number on a given bushing from 200 to 2,000 or even more. As will be readily appreciated to provide a plurality of nozzles of small diameter on the base plate forming the bottom of a bushing is a costly, time consuming process requiring great skill. Three general methods are employed in the manufacture of such nozzles or tips on base plates of bushings. These methods are described in some detail on pages 95 through 97 of the book "The Manufacturing Technology of Continuous Glass Fibers" by K. L. Loewenstein, 1973, Elsevier Scientific Publishing Company, New York.

The first method is the drop tip method which involves making an indentation on the bottom plate and with a hot flame melting wire and allowing the drops of metal to build up on the indentation. This is followed by shaping and drilling. The second method involves drilling and punching holes in the base sheet at the nozzle positions and inserting pre-manufactured solid nozzles in the holes. THe nozzles are then welded to the sheet. The last method is a cold metal drawing system which involves stamping coin like protrusions on the metal plate and cold drawing the protrusions into nozzle shape after which the nozzles are appropriately drilled. U.S. Pat. No. 3,598,952 describes the hole punching and welding system of the second method. U.S. Pat. No. 3,141,358 is exemplary of the cold metal drawing process of the last method stated above.

While all three of the processes described may be utilized to form nozzles or tips on bushing base plates they still require a considerable amount of time and effort. The cold drawing system requires several successive operations in order to draw the metal into the appropriate shapes and lengths to form a satisfactory tip or nozzle. The prepunched hole and solid insert system requires welding around each of the inserts which can be as many as 2,000 or more in a modern bushing. The drop tip method by its very nature is a tedious nozzle by nozzle system of fabrication requiring great precision, a skilled welder, and long periods of time to complete a bushing. Thus, a need still exists for the preparation of nozzles in an efficient manner that lends itself to providing on the base plate of the bushing a plurality of precisely sized nozzles required for a given bushing.

SUMMARY OF THE INVENTION

Thus, in accordance with the instant invention a method is provided for forming on a bushing base plate a plurality of nozzles which are precisely defined in size and number and can be assembled quickly. Thus, in accordance with the instant invention a bushing base plate is drilled with a plurality of precisely sized holes which represent the number of nozzles desired on the base plate of the given bushing. There is inserted into each of the holes drilled, in a snugly fitting relationship thereto a plurality of tubular nozzles of precisely defined internal diameter and which are provided on the outer wall thereof with a flat flange. The hollow tubular nozzles are inserted into the holes until flange contacts the base plate surface. A mandrel is then inserted in the free end of the hollow nozzle that is on the opposite side of the plate on which the flange is resting. The mandrel is a tapered mandrel from tip to the base thereof and the shaft and base of the mandrel is of a diameter considerably larger than the diameter of the nozzle. A mating die is placed over the tubular nozzle on the flange side of the plate to hold the flange, plate and nozzles securely while the mandrel is inserted in the opposite end of the tubular nozzle. Sufficient pressure is applied on the mandrel as it is pushed into the hollow end of the nozzle to roll the walls of the nozzle against the plate on the side opposite the flange until the rolled metal abut against the plate in a sealing relationship.

In general pressures on the order of 5,000 to 100,000 p.s.i.g. or greater are exerted against the plate by the sides of the nozzle which have been rolled against the plate by the mandrel. Preferably, the pressures are between 20,000 to about 60,000 p.s.i.g. The mandrel is then removed as is the mating die on the opposite side and the plate is placed in an oven and heated to an elevated temperature for a period of time sufficient to provide adequate sealing of the rolled side wall of the nozzle against the lower member of the plate. By adequate sealing is meant a metal to metal seal sufficient to prevent molten glass in contact with the sealed edges from passing through the metal to metal interface. While experience will indicate the amount of time and temperature necessary to accomplish an adequate seal, the adequacy of the seal can be readily determined by observing the grain structure of the metal at the metal to metal interface where nozzle wall and plate are joined under a microscope for a given set of forming conditions.

In a typical practice of the instant invention pressures on the order of 24,000 p.s.i.g. have been found to be effective in joining the base plate and nozzle wall. With respect to the heating of the plate and nozzles after the pressure cold bonding step, the heating can be conducted by placing the base plate having the nozzles affixed thereto in an oven and raising the temperature of the oven to the neignborhood of about 2,000° to 2,800° F. Temperatures in this range having been found to be effective. The limiting factor on the upper range of the temperature of course is the melting point of the metal and experience has shown that it is not necessary to approach the melting point of the metal in order to effectively seal the side walls of the nozzles to the base plate.

A BRIEF DESCRIPTION OF THE DRAWINGS

References made to the accompanying drawings in which.

DETAILED DESCRIPTION OF THE DRAWING

Figure 1:
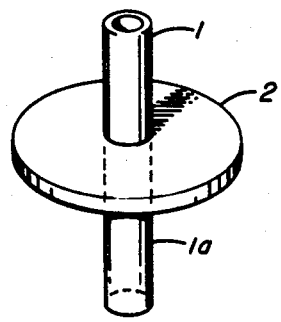
FIG. 1 shows a nozzle member with associated flange.
Figure 2:
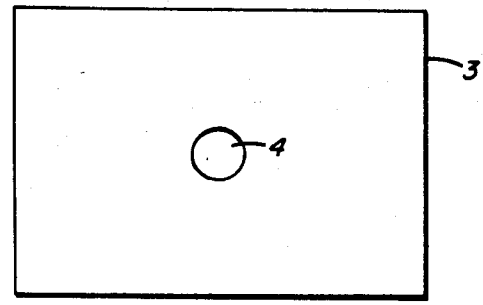
FIG. 2 is a diagrammatical illustration of a base plate with a single hole in it.
Figure 3:
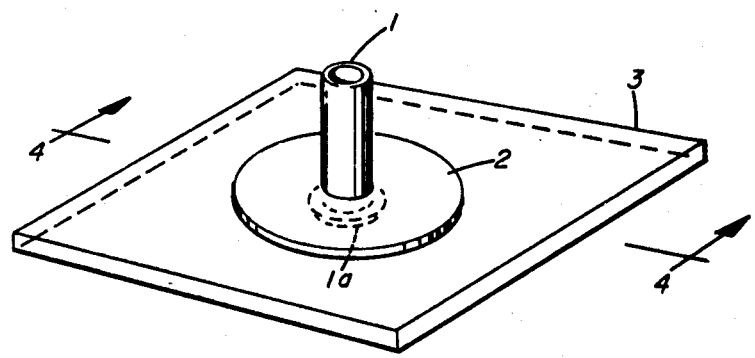
FIG. 3 is a diagrammatical illustration of the nozzle of FIG. 1 inserted in the hole of the base plate of FIG. 2 and rolled against it.
Figure 4:
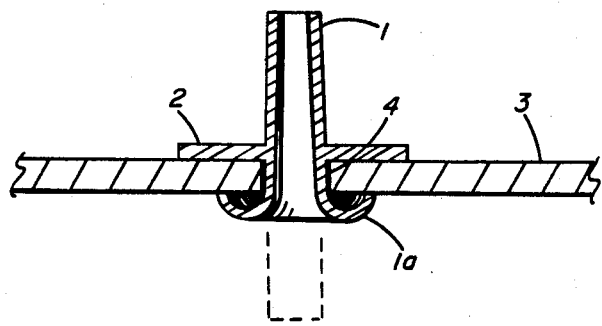
FIG. 4 is a cross section view of FIG. 3.
Figure 5:
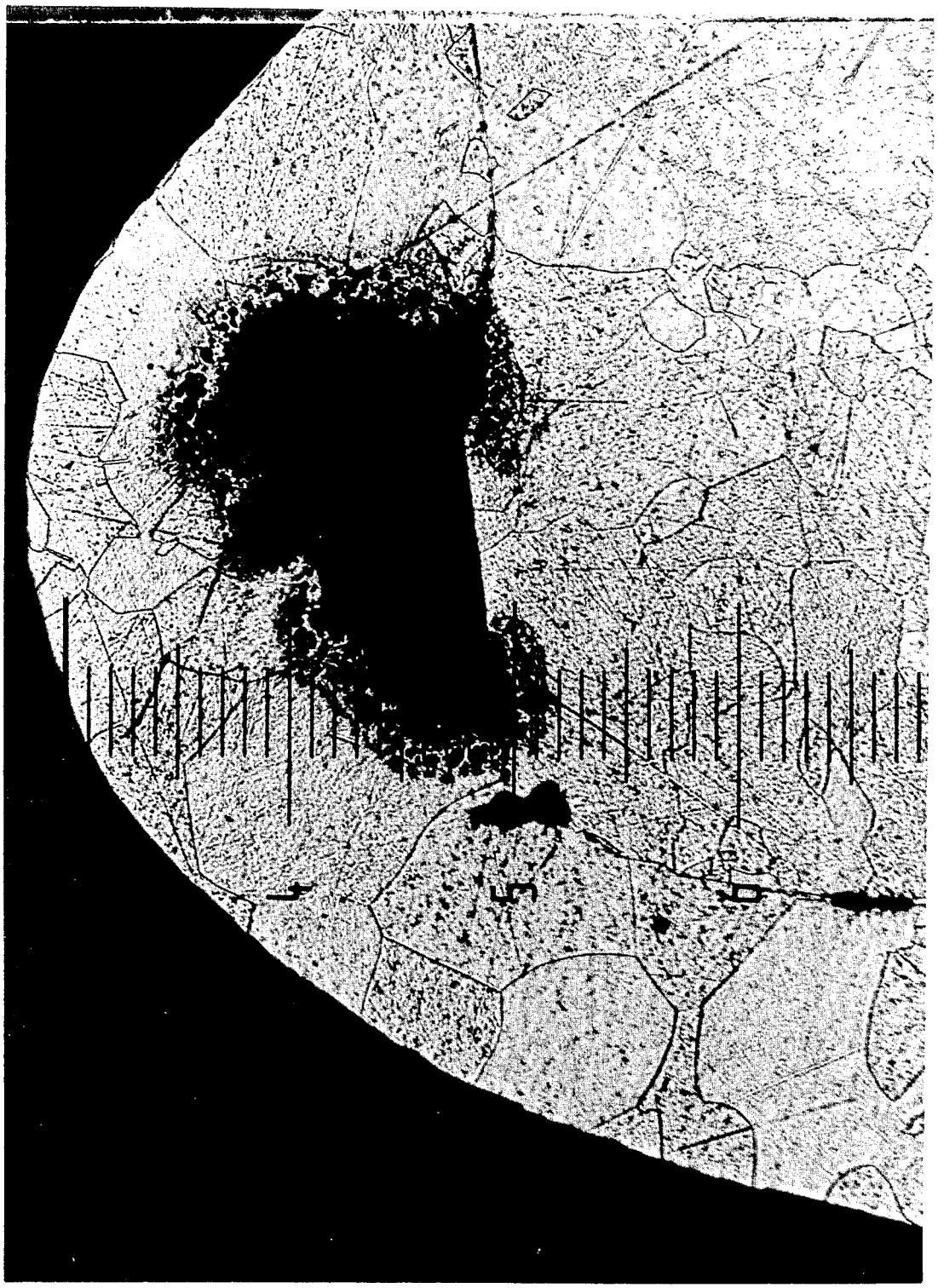
FIG. 5 is a photomicrograph of a cross section of a single nozzle which has been affixed to the base plate of a platinum-rhodium alloy bushing showing the grain structure.

Turning now to the drawings, FIGS. 1, 2, 3, and 4 in particular, there is shown a fiber forming nozzle 1 having a flange member 2 associated therewith. Flange member 2 is preferably formed as an integral part of the nozzle 1. If it is a separate piece it is welded around the entire periphery of the nozzle. The nozzle 1 is adapted to be inserted into the hole 4 of a base plate member 3 shown in FIG. 2. To asssemble the nozzle 1 to plate 3, the lower end of the nozzle 1 indicated as 1a, in FIG. 1 is inserted through hole 4 of the base plate 3 of FIG. 2. The inserted nozzle 1, prior to the rolling of the walls thereof, has the appearance shown in FIG. 3. Thus, as shown in FIG. 3, the base plate 3 snugly abuts the flange member 2 of the nozzle member 1 and the lower end 1a of the nozzle protrudes from the bottom of plate 3. In FIG. 4 the nozzle has been deformed by the application of pressure from a mandrel, not shown, to the surface of the lower member 1a of the nozzle in a manner well known in the prior art. An example of such metal handling is shown in U.S. Pat. No. 3,913,423.

The deformation of the wall of the nozzle 1 is such that the wall rolls against the plate 3 and the pressure at the jointure between the base plate 3 and the curved nozzle wall 1a is on the order of 5,000 to 100,000 p.s.i.g. or greater. Application of pressure in this range has been found effective in providing an adequate seal required for operation in a molten glass environment when coupled with the heat treatment that follows. These pressures can be accomplished with proper mandrels using mechanical or hydraulic pressing tools. Clamps, while not necessary, may be used to maintain pressures on the joints formed by the deformation of the walls of the nozzle against the plate during the subsequent heating step. It has been also found, although it does not form the preferred embodiment of the invention, that utilizing the pressurized seal and operating the base plate in a bushing exposed to hot glass can also result in applying the heat necessary to effect the desired sealing.

One benefit of the instant invention resides in the fact that the hollow tubular elements 1 can be manufactured on a mass production basis to precise internal diameters thereby insuring uniformity of tip diameters in the finished bushing. Since no welding is required this presents a distinct advantage over the method of U.S. Pat. No. 3,598,952 while providing the same uniformity of nozzle diameters obtained by that prior art method.

While in the drawing only a single nozzle is shown, it is obvious that a bushing base plate of any desired configuration can be utilized. In fact, in one embodiment of the invention, the base plate will be drilled with all of the numbers of holes required for the insertion of nozzles. The nozzles generally conforming to the configuration shown in FIG. 1 are then inserted in the holes. A jig is provided with a suitable number of restraining members to sit over the flange member of each nozzle and that portion of the nozzle rising above the flange on one side of the base plate while mandrels of the appropriate shape are placed on the other side of the plate and inserted into each of the nozzles. Pressure is then applied across the two sides of the plate sufficient to roll the nozzle walls down against the plate 3 with the mandrels to configurations as shown in FIG. 4. The pressure at the joint between the base plate 3 and the nozzle wall is applied to at least 5,000 p.s.i.g. The plate with the nozzles in place is then placed in an oven and heated to the appropriate temperatures, as stated herein before, and preferably between 2,000° to 2,400° F. The base plate is then ready for assembly into bushing form. Thus, the plate with nozzles attached is assembled into a normal fiber glass bushing by welding appropriate side walls, flanges and electrical connections thereto. These steps are well known to those skilled in the art and are described in more detail in the aforementioned Loewenstein book on pages 97 through 106.

Typically fiber glass bushings are made of precious metal such as platinum and alloys thereof. Platinum-rhodium alloys are most commonly employed in a 90-10 to 80-20 ratio platinum to rhodium. While the present invention has found particular utility in dealing with such alloys it is not intended to be limited thereby since the invention has utility with any metal capable of being cold worked with a mandrel and which can be used to handle molten glass.

While the invention has been described with reference to certain specific examples in illustrated embodiments it is not intended to be limited thereby accept insofar as it appears in the accompanying claims.

I claim:

1. A method of preparing a bottom plate for a bushing with a plurality of precisely defined nozzles or tips comprising drilling a plate defining the bottom of the bushing with a plurality of holes to accommodate the desired number of nozzles, inserting in each of said holes a hollow tubular nozzle having a flange member positioned between the ends thereof until the flange member abut against said plate, inserting a mandrel into one end of the tubular nozzle, said mandrel being tapered so that upon insertion it expands the tubular nozzle in all directions, applying sufficient pressure to the mandrel to roll the tubular nozzle walls onto said plate while maintaining sufficient pressure against said plate by the walls of said nozzle to establish a firm bond, and heating the plate to an elevated temperature for a period of time sufficient to effectively seal the metal plate to the nozzle wall.

2. The method of claim 1 wherein the pressure maintained against the plate is at least 5,000 p.s.i.g.

3. The method of claim 1 wherein the plate is heated to a temperature of at least 2,000° F.

4. The method of claim 2 wherein the plate is heated to a temperature of 2,000° to about 2,800° F.

5. The method of claim 2 wherein the pressure maintained against the plate is between 5,000 to 100,000 p.s.i.g. and the temperature is maintained between about 2,000° to 2,800° F.

6. The method of claim 1 wherein the pressure maintained against the plate is about 24,000 p.s.i.g. and the temperature is maintained at about 2,000° F.

* * * * *